INVENTOR.
John G. Vergobbi
ATTORNEY

INVENTOR.
John G. Vergobbi
BY
Robert R. Churchill
ATTORNEY

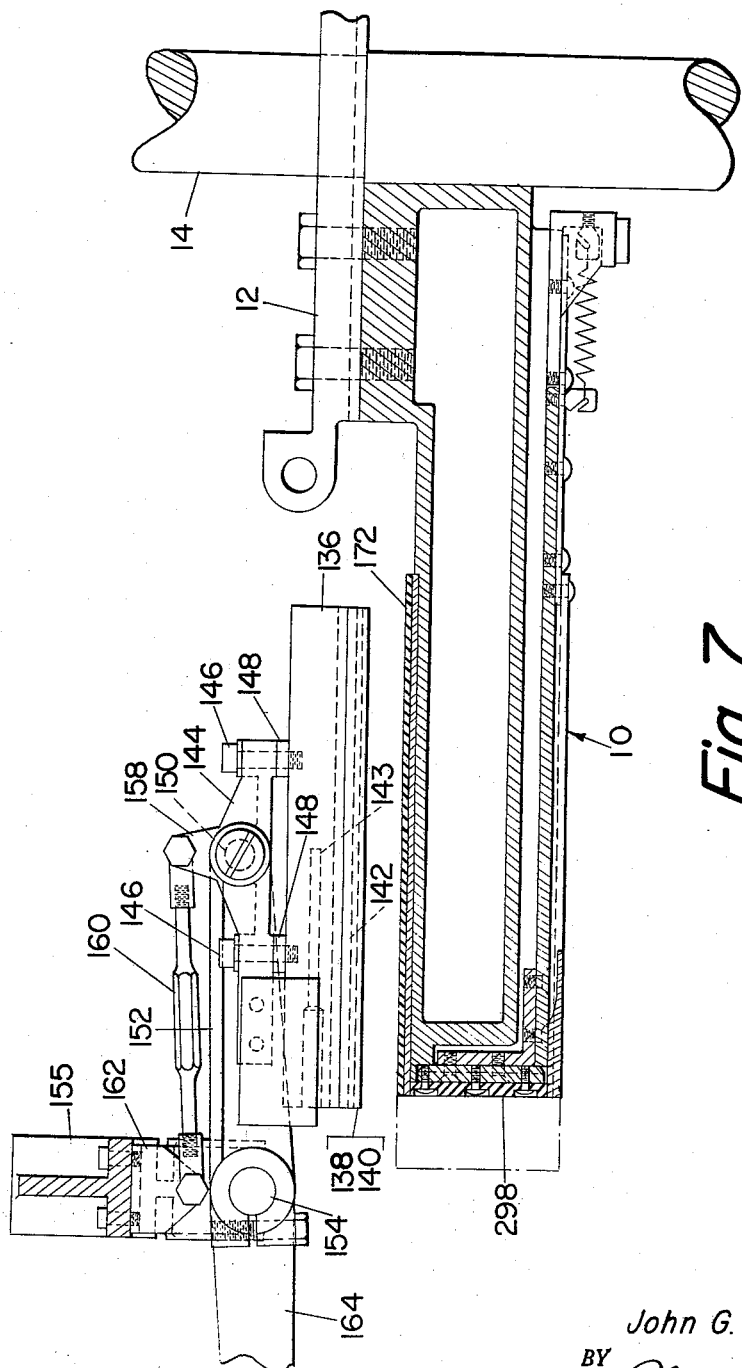

INVENTOR.
John G. Vergobbi
BY Robert C. Churchill
ATTORNEY

May 7, 1963

J. G. VERGOBBI 3,088,380

CONTAINER FORMING MACHINE

Filed June 28, 1961

INVENTOR.
John G. Vergobbi
BY
ATTORNEY

May 7, 1963

J. G. VERGOBBI 3,088,380

CONTAINER FORMING MACHINE

Filed June 28, 1961

INVENTOR.
John G. Vergobbi
BY
Robert R. Churchill
ATTORNEY

May 7, 1963　　　　J. G. VERGOBBI　　　3,088,380
CONTAINER FORMING MACHINE
Filed June 28, 1961　　　　　　　　　　　　15 Sheets-Sheet 14

INVENTOR.
John G. Vergobbi
BY Robert R. Churchill
ATTORNEY

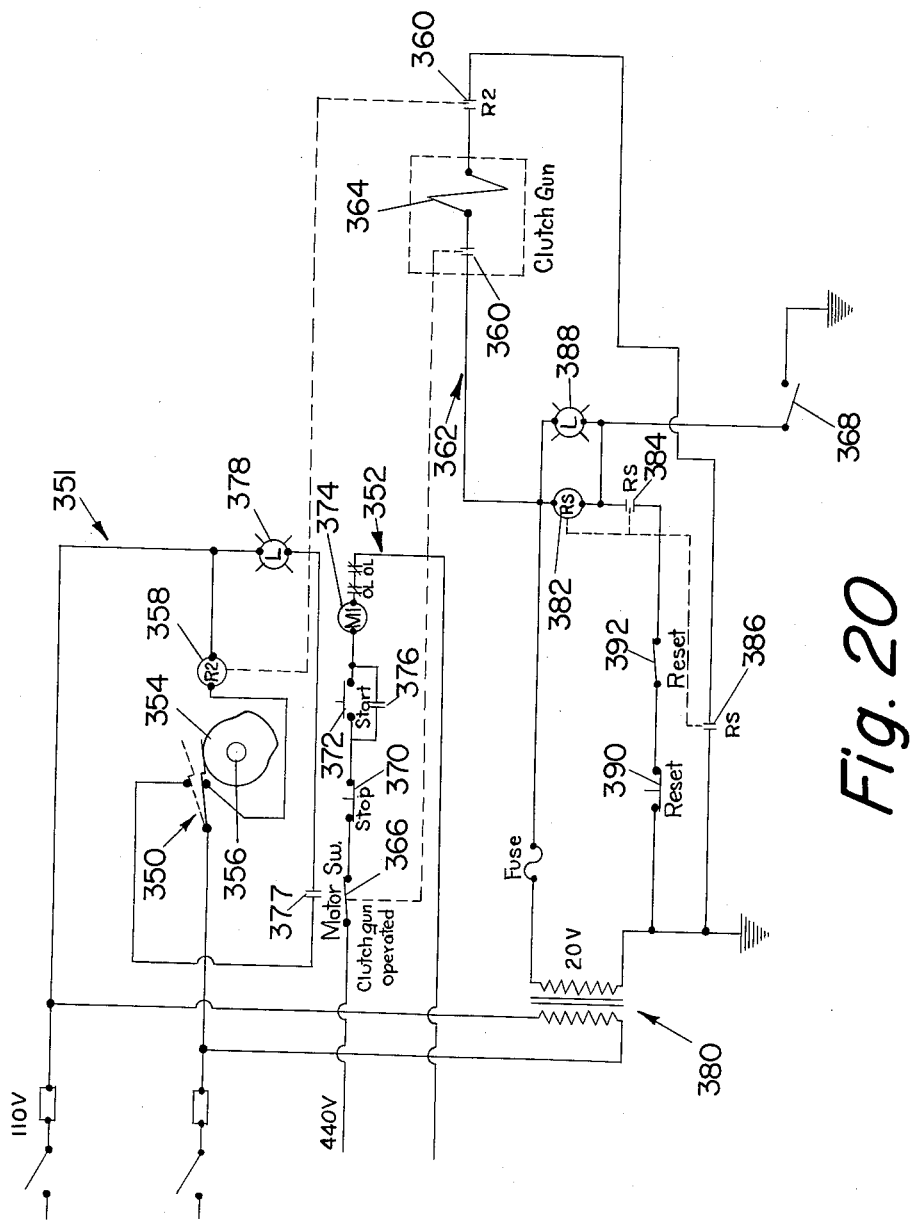

United States Patent Office 3,088,380
Patented May 7, 1963

3,088,380
CONTAINER FORMING MACHINE
John G. Vergobbi, Quincy, Mass., assignor to Pneumatic Scale Corporation, Limited, a corporation of Massachusetts
Filed June 28, 1961, Ser. No. 120,296
20 Claims. (Cl. 93—12)

This invention relates to a container forming machine.

The invention has for an object to provide a novel and improved container forming machine of the type provided with a forming block about which a blank of container material may be wrapped to form the container and in which novel provision is made for folding and sealing the container while disposed on the forming block in a novel and efficient manner such as to produce a leakproof and airtight container.

With this general object in view and such others as may hereinafter appear, the invention consists in the container forming machine and in the various structures, arrangements and combinations of parts hereinafter described and particularly defined in the claims at the end of this specification.

In the drawings:

FIG. 7 is a detail view in side elevation of the side seam sealing bar and its operating mechanism, the forming block being shown in cross section taken on the line 7—7 of FIG. 4;

FIG. 20 is a control circuit to be referred to.

Figure 1:
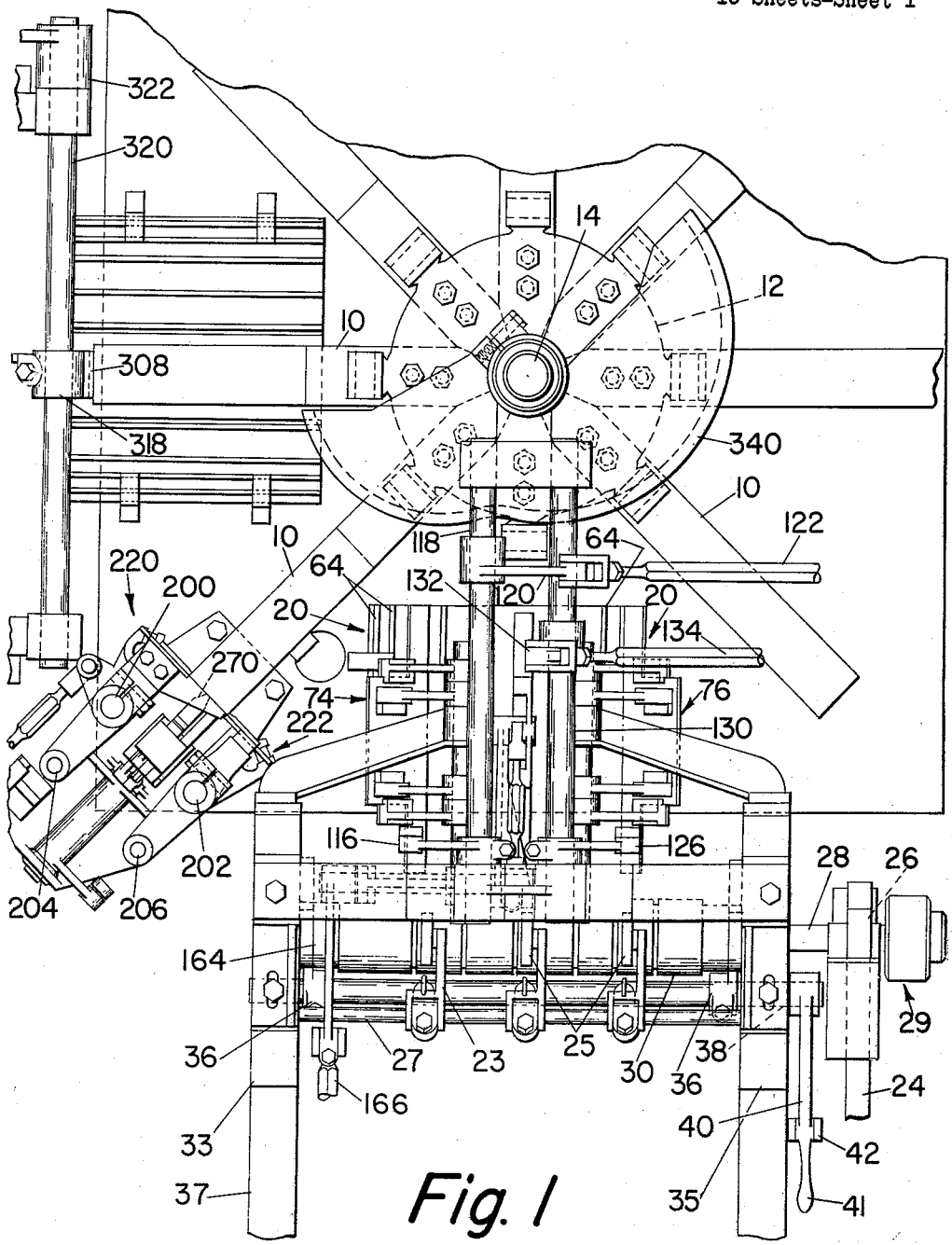
FIG. 1 is a plan view of a container forming machine embodying the present invention.

In general the present invention contemplates a container forming machine having provision for producing a rectangular container or liner bag having a heat sealed overlapping side seam and a heat sealed bottom closure. The invention is herein illustrated as embodied in a container forming machine of the type adapted to form a composite container comprising an inner liner bag and an outer bag or carton on a forming block and may comprise a machine of the general type illustrated and described in my United States Patent No. 2,533,642, issued December 12, 1950. Such prior container forming machines are provided with a plurality of horizontal forming blocks arranged to be intermittently moved to present the forming blocks successively to the various lining bag and carton forming stations of the machine. In the operation of such machines a lining blank is first folded about a forming block to form a tube, and at a succeeding station of operation portions of the lining blank extending beyond the end of the forming block are folded and sealed to form the bottom of the lining bag. At subsequent stations an outer blank or carton is wrapped about the liner bag on the block whereupon the composite liner and carton may be stripped from the forming block ready to be filled and top sealed. In accordance with the present invention novel mechanism is provided for forming a longitudinally extended overlapping heat sealed side seam in the liner bag at one station of operation; forming a bottom closure and providing a heat sealed seam therein at a second station of operation; and completing the bottom closure heat sealing operation of a third station to produce an airtight liner bag. The present container forming machine embodies heat sealing elements movable into and out of operative relation to the forming block, and provision is also made in the present machine for controlling the operation of the machine in a manner such as to assure that the sealing bars are in their retracted position when the machine is stopped.

Referring now to the drawings, 10 represents the forming blocks secured to a spider 12 mounted upon a central shaft 14 arranged to be intermittently rotated to present the forming blocks to successive stations in the formation of a composite liner and carton. Inasmuch as machines of this type, which are provided with mechanisms for wrapping first the liner about the forming block and for subsequently wrapping the outer carton thereabout, are well known in the packaging art only sufficient portions of the machine have been herein illustrated and will be hereinafter described as will enable the present invention to be understood.

In the operation of the machine the container forming material, which may comprise an elongated strip of thermoplastic material 16, such as "Pliofilm," may be unwound from a roll thereof, not shown, and advanced by intermittently operated feeding mechanism indicated generally at 18 on top of supporting and folding elements indicated generally at 20 to present the leading edge of the strip against stop members 22 whereby to dispose the leading portion of the strip in operative position beneath a forming block 10. The intermittently operated feeding mechanism 18 may be of a known type wherein a reciprocable rack 24 in mesh with a gear 26 is operated to rotate shaft 28 upon which the feed roll 30 is mounted to advance a predetermined length of the strip each cycle of operation during the advancing stroke of the rack 24.

Figure 2:
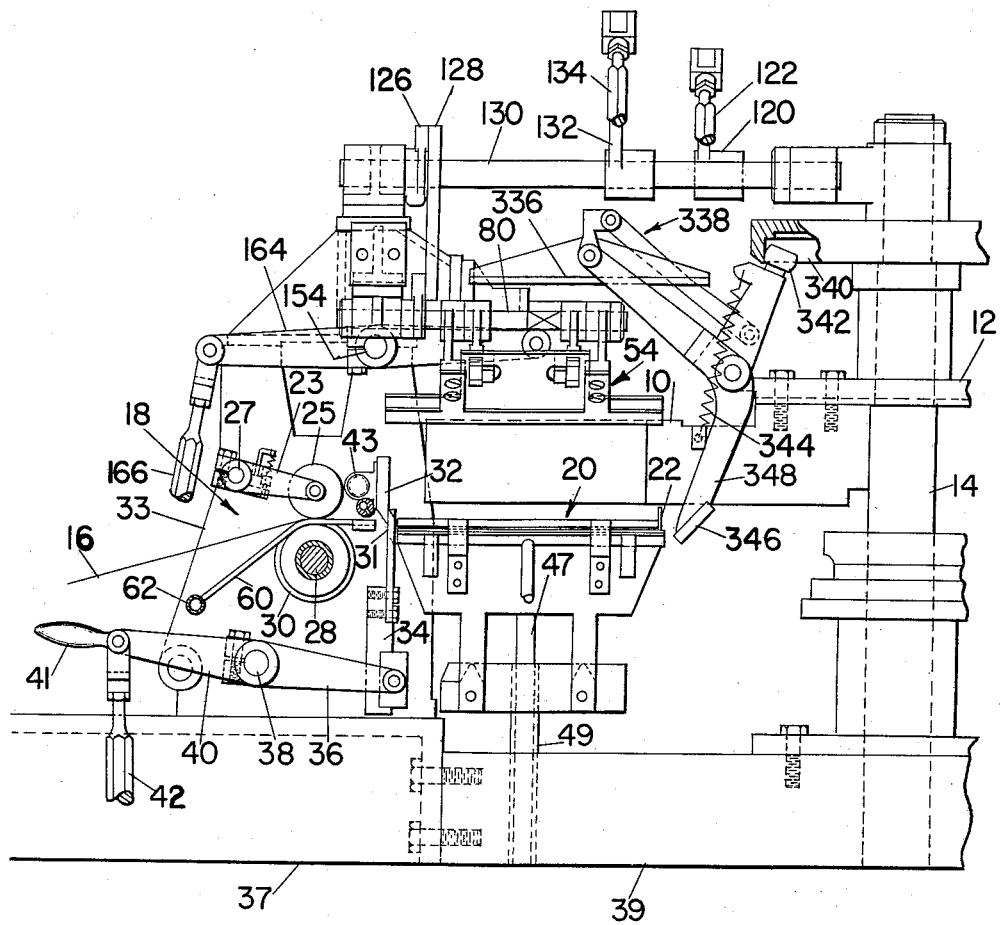
FIG. 2 is a side elevation partly in cross section of the side seam forming and sealing station of operation shown in FIG. 1.

As illustrated in FIG. 2, a plurality of cooperating pressure rollers 25 carried by arms 23 pivotally mounted at 27 may be resiliently urged toward the feed roller 30 to effect advancement of the strip. The gear 26 may form part of a known clutch mechanism indicated generally at 29 which is arranged to release the shaft 28 during the return stroke of the rack.

After the leading portion of the strip is positioned, as described, the strip may be severed by a vertically reciprocable knife blade 31 which cooperates with a stationary blade 32 secured to the machine frame. The blade 31 is attached to a block 34 carried by spaced arms 36 fast on a shaft 38. An arm 40, also fast on the shaft 38 is connected by a link 42 to operating mechanism forming a part of the container forming machine and which is arranged to operate the blade 31 to sever the strip in timed relation to the operation of the feeding mechanism. The arm 40 may be provided with a handle 41 to permit manual operation. As shown in FIG. 1, the strip feeding and severing mechanisms may be supported between side frames 33, 35 supported on an extension 37 from the platen 39 of the machine frame.

When the material being handled comprises a relatively thin, lightweight flexible sheet material, such as "Pliofilm," difficulties are encountered in advancing the leading end of the severed strip across the supporting and folding elements 20 because of the lack of rigidity of the material and also because of the adverse effects of static electricity. As herein shown, in order to neutralize or balance the effects of static electricity during the intermittent advance of the strip, an elongated static eliminator rod 43 may be positioned to direct its charges on the strip at a point intermediate the intermittently operated feed roll 30 and the strip severing blades 31, 32. Also, for controlling the movement of the leading portion of the strip during the advance thereof, streams of air are caused to flow along the underside of the leading portion in the direction of movement of the strip by the provision of a plurality of relatively small spaced tubes or jets 60 connected to an air supply manifold 62 as illustrated and described in my United States Patent No. 2,596,625. As herein shown, the tubes 60 are curved around the feed roller 30 in spaced peripheral grooves formed therein and are extended horizontally parallel to and immediately beneath the web being advanced. The supporting and folding elements 20 include a plurality of spaced ribs or rods 64 secured to the upper surfaces of the folding elements and extended in the direction of the web movement. In practice the spaced rods over which the strip is advanced are preferably provided with a coating of antistick material, such as "Teflon" to reduce the effect of friction to a minimum.

Figure 4:
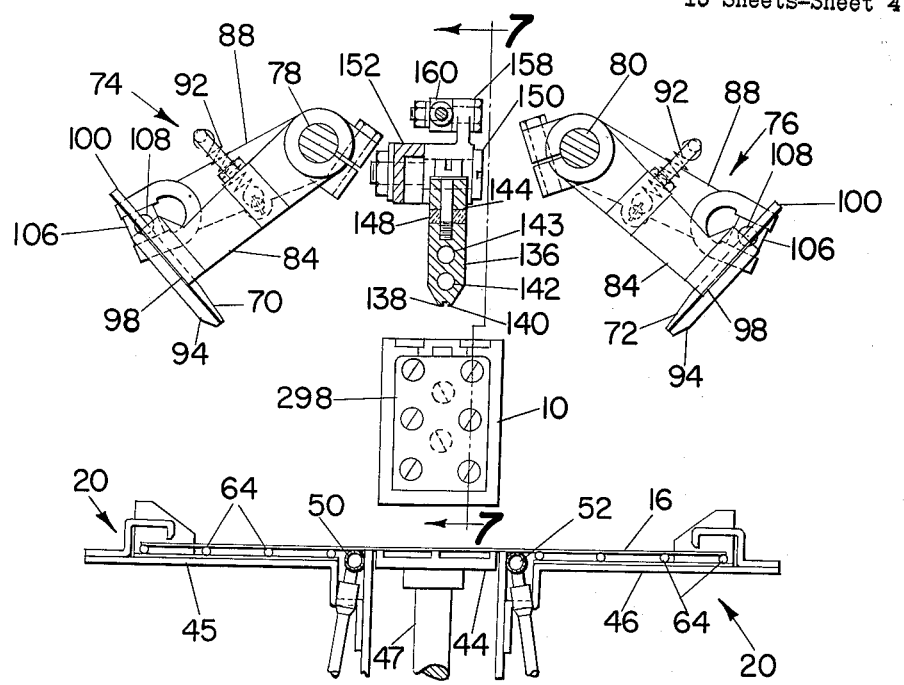
FIG. 4 is a detail view in front elevation showing the container forming mechanism and the side seam forming and sealing elements in their retracted position of operation.
Figure 5:
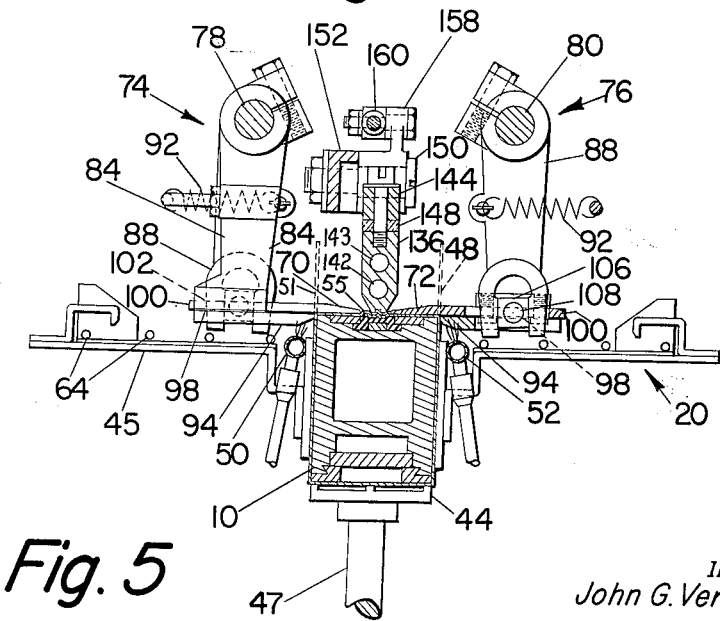
FIG. 5 is a detail view similar to FIG. 4 showing the parts in their sealing position of operation, some of the parts being shown in cross section as seen from the line 5—5 of FIG. 6.

The rectangular blank thus severed from the strip is supported beneath the forming block 10 on top of the folding elements 20 which, as shown in FIG. 4, may comprise vertically reciprocable plates, including a bottom plate 44 and side plates 45, 46, together with laterally extended blank supporting portions carried thereby and which are arranged to be elevated to wrap the blank about the bottom and two sides of the block 10. As illustrated in FIGS. 2 and 4, the bottom plate 44 may be secured to the upper end of a shaft 47 arranged to be reciprocated through cam operated mechanism, not shown, and forming a part of the container forming machine. The side plates 45, 46 are carried by a collar mounted at the upper end of a sleeve shaft 49 surrounding the shaft 47 and supported for reciprocation in the machine frame and may be similarly operated in a known manner. In practice the bottom plate 44 is elevated to present and retain the blank in firm engagement with the underside of the block, as shown in FIG. 5, while the side plates 45, 46 continue upwardly to wrap the blank against the sides of the block, as shown in FIG. 5, leaving opposed portions 48, 51 of the blank extended upwardly beyond the top surface of the block. Air jets 50, 52, carried by the vertically reciprocal supporting elements 20, are arranged to direct streams of air against the extended portions 48, 51, which are of substantially equal length, to maintain the same in operative position to be engaged by the novel folding and sealing mechanism indicated generally at 54 to provide a longitudinally extended overlapping side seam 55 disposed substantially medially of the upper surface of the forming block as shown.

Figure 3:
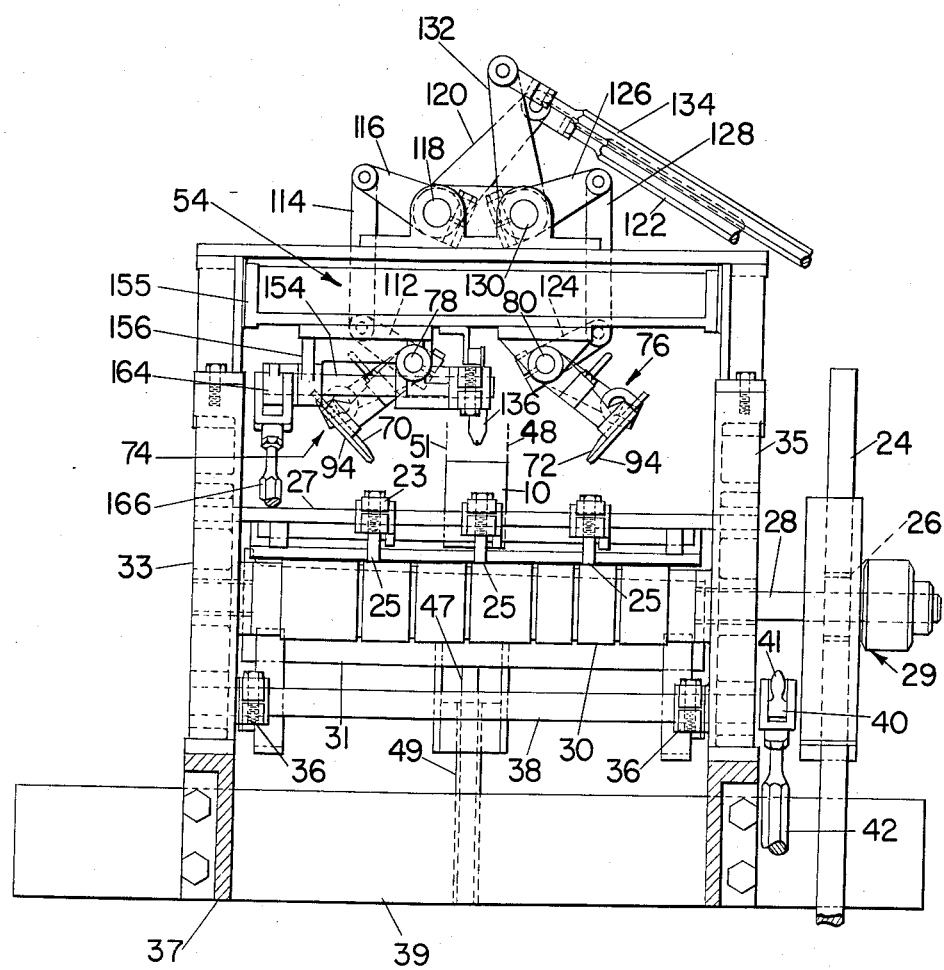
FIG. 3 is a front elevation of the mechanism shown in FIG. 2 illustrating the blank feeding mechanism and the side seam forming and sealing elements.
Figure 6:
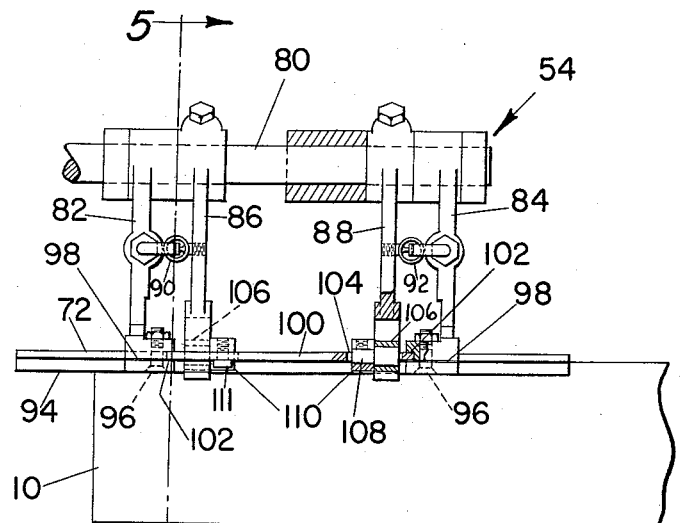
FIG. 6 is a detail view in side elevation of the side seam folding elements shown in FIG. 5 and shown partly in cross section.

Referring now to FIG. 3, the side seam folding mechanism includes a pair of cooperating folding plates 70, 72 mounted to be rocked into a position parallel to the upper surface of the horizontal forming block 10 and to then be moved horizontally parallel to the plane of said upper surface to effect folding inwardly of the extended portions 48, 51 against said upper surface with the marginal edges thereof in overlapping relation. The folding plates 70, 72 are carried by similar opposed folding units 74, 76 mounted on rocker shafts 78, 80, respectively. As illustrated in FIGS. 4, 5 and 6, each folding unit includes a pair of spaced arms 82, 84 loosely mounted on the rocker shaft and a pair of spaced arms 86, 88 fast on the rocker shaft, the arms 82, 86 and 84, 88 being connected to move together by springs 90, 92, respectively. An elongated retaining plate 94 extends between the lower ends of the spaced arms 82, 84 and is secured thereto by screws 96. The elongated folding plate 72 is disposed immediately above and parallel to the retaining plate being separated therefrom by a relatively thin spacer 98. The folding plate is provided with a rearwardly extended portion 100, and the marginal edges thereof are slidingly received in opposed grooves 102 formed in the spaced arms 82, 84, the grooves being parallel to the retaining plate. The rearwardly extended portion 100 is provided with spaced openings 104 through which the lower ends of the spaced arms 86, 88 extend, said lower ends being slotted to slidingly receive bearing blocks 106. The bearing blocks are mounted on pins 108 carried by brackets 110 secured to the folding plate 72 by bolts 111.

In operation when the folding units 74, 76 are rocked from their retracted position, as shown in FIG. 4, to their folding position, as shown in FIG. 5, the front ends of the retaining plates 94 first engage opposed sides of the forming block adjacent the upper edges or corners thereof to hold the upwardly folded portions 48, 51 of the blank in engagement with the block during the inward folding of the same. At this time the upper surfaces of the retaining plates are arranged in the same plane as the upper surface of the forming block and parallel to the grooves 102 in which the positively moved folding plates 70, 72 are slidingly supported so that the latter continue across the top of the forming block in parallel relation thereto to effect the folding operation. In other words the retaining plates and the folding plates move together during the rocking movement until the retaining plates come to rest in engagement with the forming block by virtue of the spring connections, and thereafter the folding plates are cause to continue their movement in a plane parallel to the upper surface of the forming block by virtue of the parallel grooves and the block and slot connections. In practice the folding units 74, 76 are preferably rocked independently in a sequence such as to fold the marginal edge of the extension 51 in overlapping relation to the marginal edges of the extension 48, the overlapping seam 55 occurring substantially medially of the side wall of the tube, and the folding plates 70, 72 are then retracted to come to rest in the position shown in FIG. 5 to retain the extensions in overlapping engagement preparatory to and during the heat sealing operation. The provision of the corner engaging retaining plates 94 prevents drawing back of the folded extensions during retraction of the folding plates whereby to avoid distortion of the liner bag at the adjacent corners or longitudinal edges thereof. Furthermore, the provision of the retaining plates to hold the extended portions 48, 51 against the edges of the block, and the parallel arrangement of the folding plates 70, 72, as compared with the curved rocker plates heretofore used for the folding operation, permits the folding plates to initially engage the extended portions 48, 51 at a point adjacent the corners or longitudinal edges of the block over which the portions are folded whereby to provide a tight fold at such corners.

As illustrated in FIG. 3, the rocker shaft 78 is provided with an arm 112 connected by a link 114 to an arm 116 fast on an upper rocker shaft 118 supported in the machine frame. The shaft 118 is further provided with an arm 120 fast thereon which is connected by a link 122 to cam operated mechanism, not shown, forming a part of the container forming machine. Similarly, the rocker shaft 80 is connected by arms 124, 126 and link 128 to an upper rocker shaft 130, the latter being provided with an arm 132 connected by a link 134 to a second cam operated mechanism, not shown, and which also forms a part of the container forming machine.

Referring now to FIGS. 3 and 7, the side seam sealing mechanism includes an elongated heat sealing bar 136 having a pair of spaced, relatively narrow and longitudinally extended sealing ridges 138, 140 and is mounted for movement into and out of sealing engagement with the overlapping portions of the side seam. The bar 136 is provided with electrical heating units indicated at 142 and with a thermostatic control unit indicated at 143 arranged to maintain the heating bar at a predetermined temperature.

As shown in FIG. 7, the heat sealing bar 136 is connected to a bracket 144 by bolts 146 provided with heat resistant spacers 148. The bracket 144 is pivotally mounted on a stud 150 carried by an arm 152 forming a part of a parallel linkage. The arm 152 is keyed to a rocker shaft 154 supported in a bracket 156 attached to a tie piece 155 forming a part of the machine frame. An arm 158 extended from the bracket 144 is connected by a link 160 to an angle bracket 162 also attached to the tie piece 155. The rocker shaft 154 is provided with an arm 164 connected by a link 166 to cam operated mechanism, not shown, and forming a part of the container forming machine.

Figure 8:
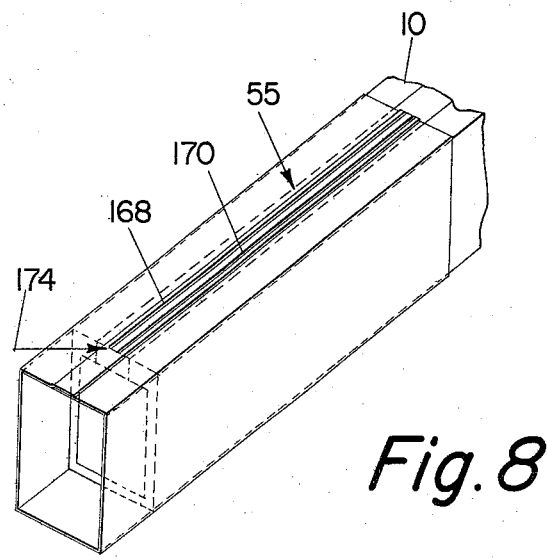
FIG. 8 is a perspective view of a horizontal forming block showing a blank of container forming material wrapped thereabout to form a tube provided with a heat sealed side seam and showing portions of the tube extended beyond the end of the forming block.

In operation the cam operated mechanism effects movement of the sealing bar 136 into and out of sealing engagement with the overlapping portions of the side seam in a substantially straight line motion by virtue of the parallel linkage to effect a double line heat seal therein along spaced lines 168, 170 as illustrated in FIG. 8. The sealing bar ridges 138, 140 are arranged to cooperate with a resilient portion of the forming block which may comprise an insert 172 of a rubberlike material, such as "neoprene" or silicone rubber, capable of withstanding heat. The heat sealing operation effects softening and flowing together of the thermoplastic material of the overlapping portions to form the fused or welded line seals 168, 170. In practice the sealing ridges 138, 140 and the upper surface of the cooperating resilient insert 172 may be coated with a suitable antistick material, such as "Teflon," to prevent sticking of the softened material to the sealing elements. It will be observed that the tubular structure thus formed extends beyond the outer end of the forming block to provide extended wall portions for forming a bottom closure at a subsequent station of operation. It will also be observed that the seal lines 168, 170 extend only to the outer end of the forming block, that is, the seal lines terminate substantially at the outer edge of the block, indicated at 174, leaving the overlapping portions 176 of the tube free and unsealed. However, as herein shown, the sealing bar 136 extends a short distance beyond the end of the forming block so that in practice the seal lines will extend a short distance beyond the adjacent edge of the block.

From the description thus far it will be seen that an overlapped and heat sealed side seam 55 is formed disposed substantially medially of the upper side wall of the partially formed bag, and after the side seam seal is completed the folding plate units 74, 76 are retracted, the sealing bar 136 is elevated, and thereafter the spider 12 is intermittently rotated to present the forming block with its partially formed liner bag to the second station of operation where the extended end wall portions of the tube are folded inwardly against the end of the forming block in overlapping relation in a predetermined sequence to form the bottom closure. In practice the upper and lower extended end walls are first folded inwardly simultaneously against the end of the forming block by cam operated, vertically reciprocable folding plates 178, 180 to provide tapering or trapezoidal shaped flaps 182, 184, respectively. Then, the remaining opposed extended end walls are folded inwardly against the end of the forming block by opposed folding plates 186, 188 to likewise provide tapering or trapezoidal shaped flaps 190, 192, the first folded flaps 182, 184 being connected to the last folded flaps by triangular shaped gussetlike folds 194 which overlie the first folded flaps and underlie the last folded flaps as illustrated.

Figure 9:
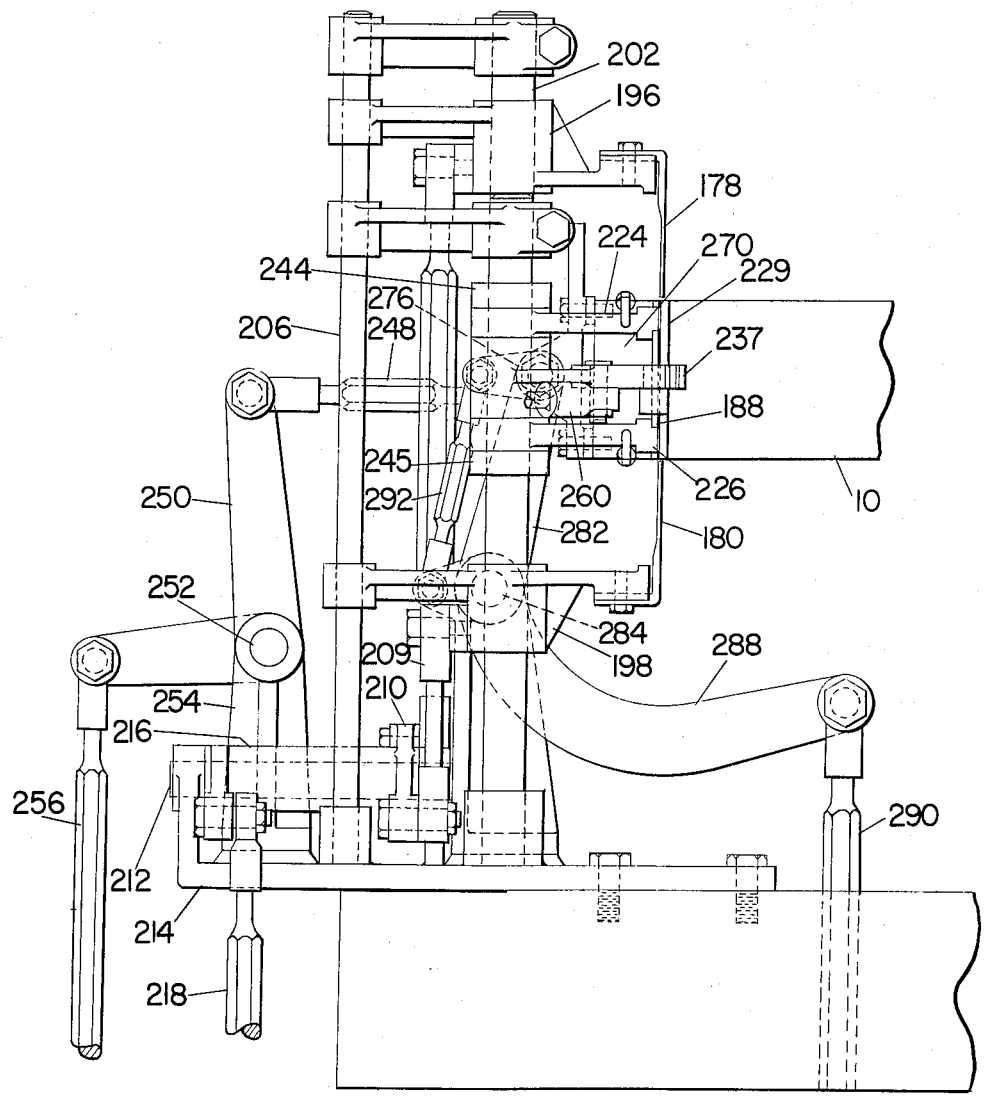
FIG. 9 is a side elevation partly in cross section of the bottom closure folding and sealing station of operation.
Figure 10:
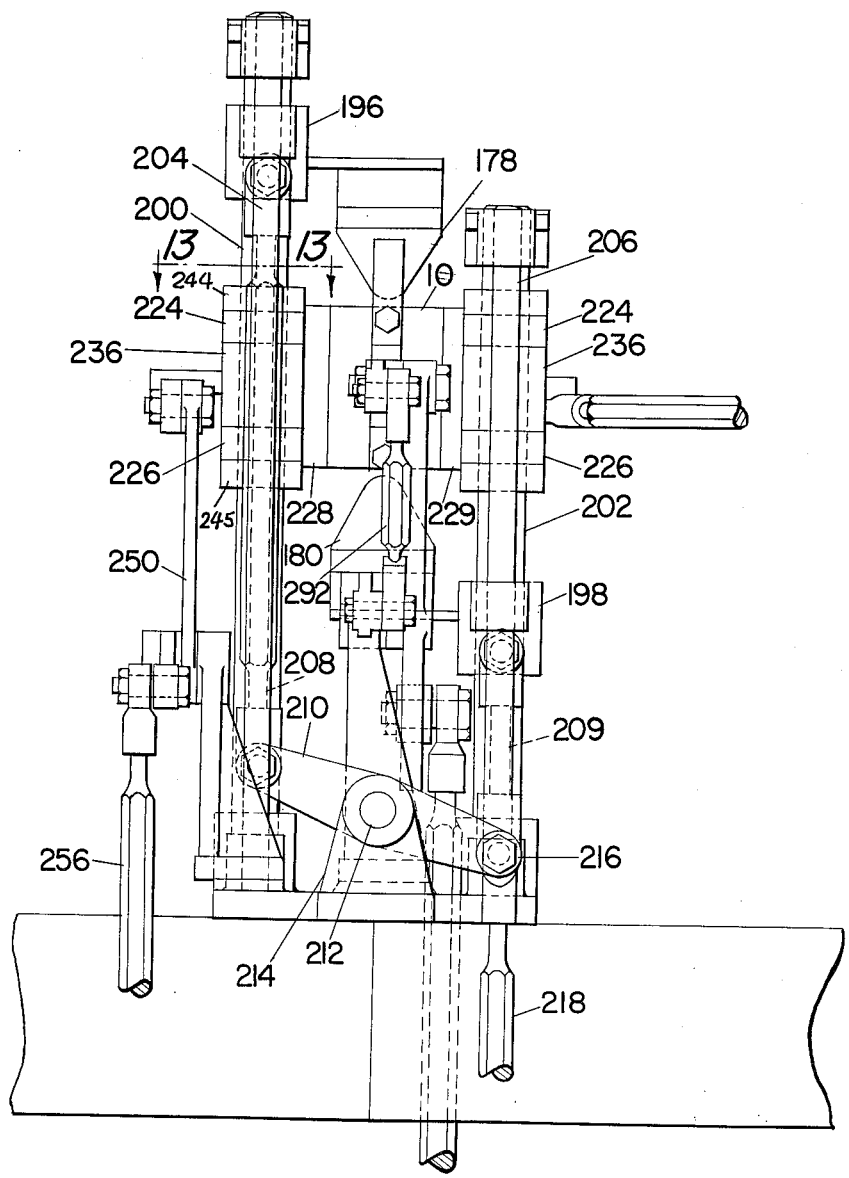
FIG. 10 is a front elevation of the same.
Figure 11:
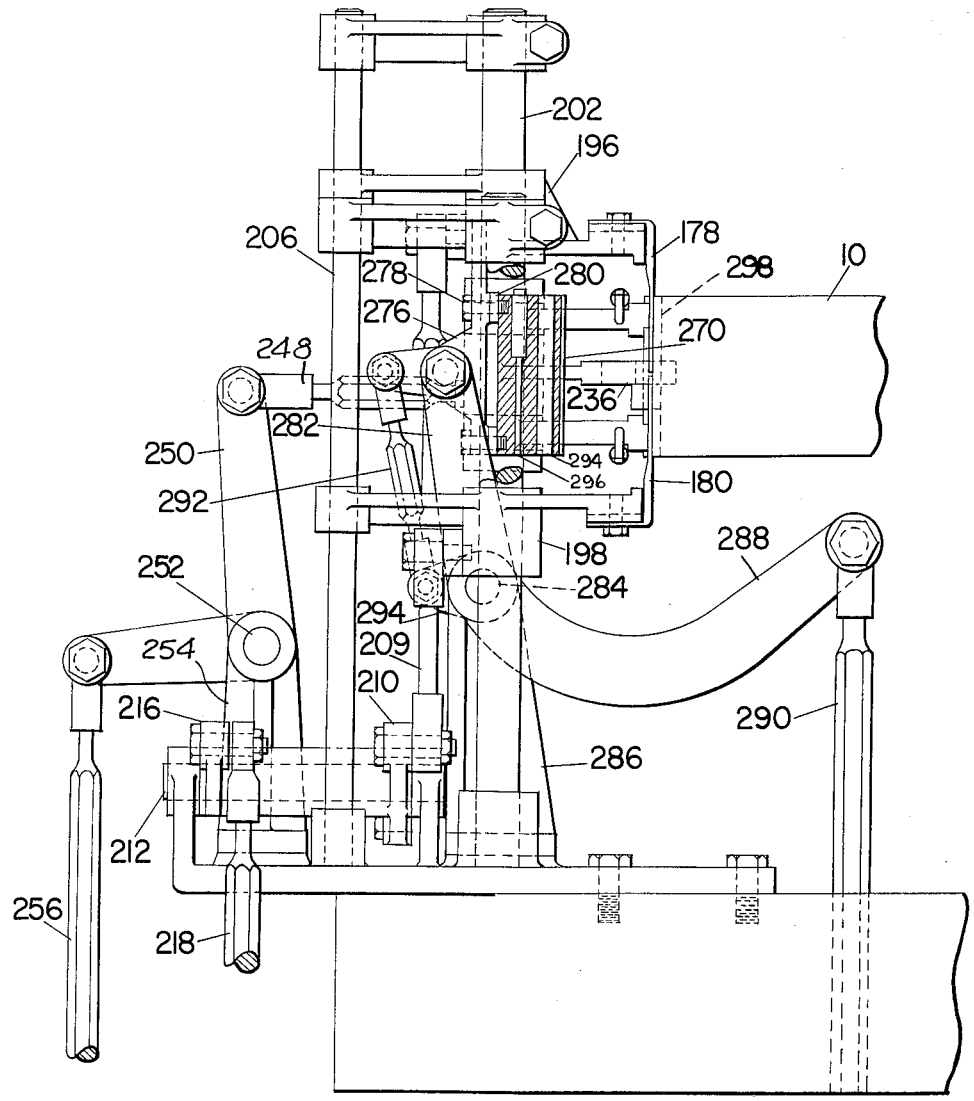
FIG. 11 is a view similar to FIG. 9 showing the parts in a different position of operation.
Figure 12:
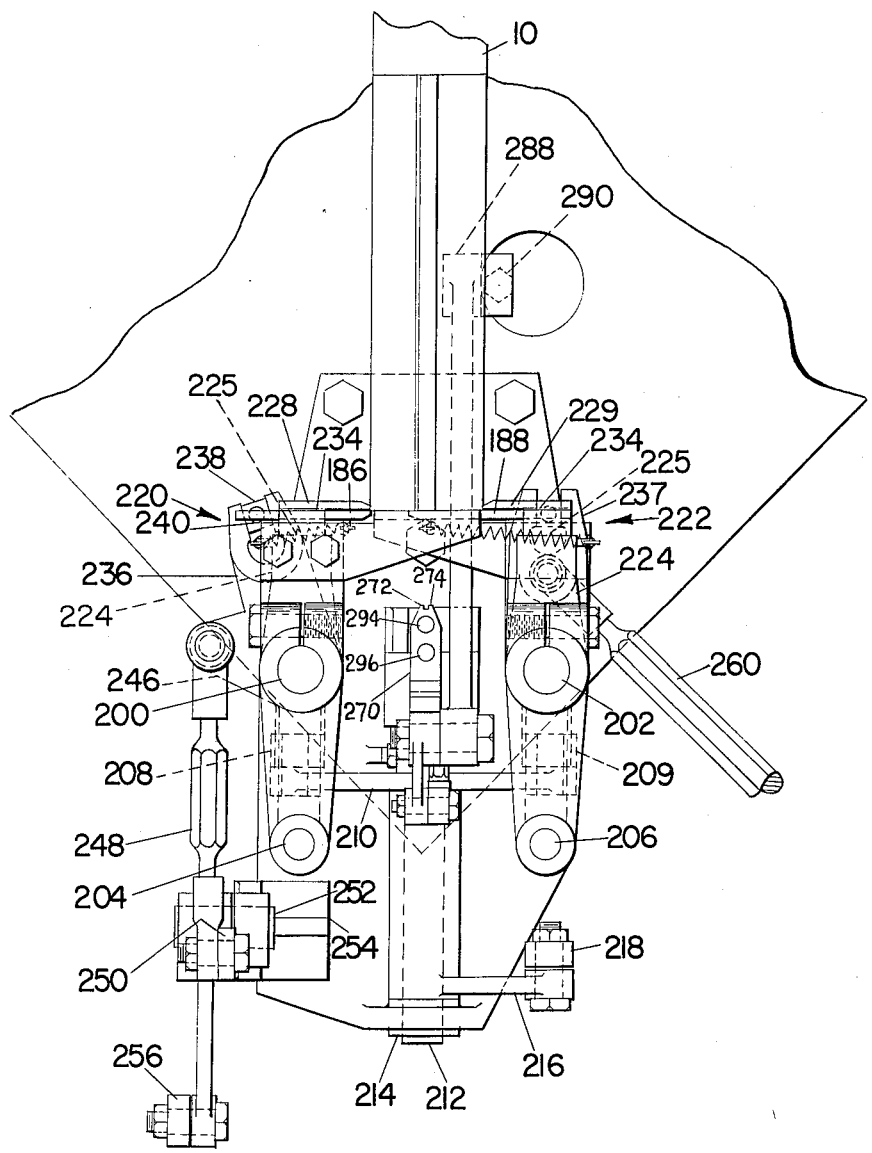
FIG. 12 is a plan view of the same showing the bottom closure sealing bar in its retracted position.
Figure 13:
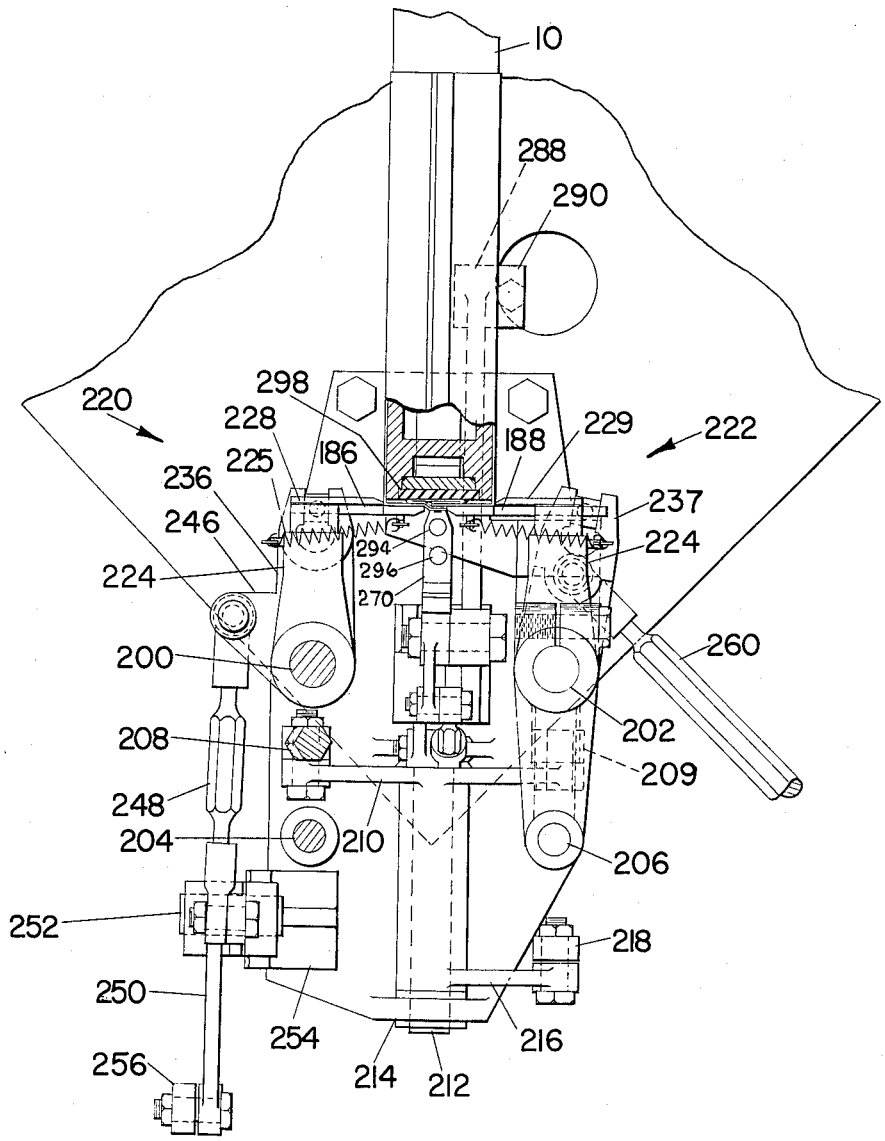
FIG. 13 is a view similar to FIG. 12 showing the sealing bar in its sealing position and partly in cross section as seen from the line 13—13 of FIG. 10.

As illustrated in FIGS. 9, 10 and 12, the folding blades 178, 180 are carried by opposed brackets 196, 198, each bracket being mounted for vertical reciprocation on spaced vertical shafts 200, 202, respectively. Extensions of the brackets 196, 198 are provided with guide openings arranged to be slidingly received on a pair of spaced vertical guide shafts 204, 206 to prevent rocking of the brackets 196, 198 on their shafts 200, 202 during vertical reciprocation thereof. Each bracket is connected by a link 208, 209 to the opposite ends of a two armed lever 210 mounted fast on a shaft 212 journaled in a bracket 214 secured to the machine frame. An arm 216 fast on the shaft 212 is connected by a link 218 to cam operated mechanism, not shown. In operation when the two armed lever 210 is rocked in one direction the bracket 196 with its folding plate 178 is lowered to fold the upper wall extension inwardly, and the bracket 198 with its folding plate 180 is simultaneously elevated to fold the lower wall extension inwardly against the bottom of the block to provide the flaps 182, 184, and when the lever 210 is rocked in the opposite direction the folding plates are simultaneously retracted.

The folding plates 186, 188 are carried by opposed folding units 220, 222 which are similar in construction and mode of operation to the folding units 74, 76 described for performing the side seam folding operation wherein the folding plates are rocked into a position parallel to the surface of the blocks against which the flaps are folded and then continue their folding movement in such parallel relationship. As herein shown, each folding unit includes a pair of vertically spaced arms 224, 226 mounted to rock on the vertical shafts 200, 202 which carry therebetween a bumper plate 228 secured to the outer ends of the arms. The spaced arms 224, 226 also carry therebetween the folding plate 186 slidingly received in grooves formed in the arms and disposed inwardly of and parallel to the bumper plate 228 being separated therefrom by a relatively thin shim or wear plate 234. An intermediate arm 236, fast on the vertical shaft 200, is slotted at its outer end to slidingly receive a bearing block 238 mounted on a stud 240 carried by the folding plate 186, and the unit is confined vertically on the shaft by upper and lower collars 244, 245. As illustrated, the loosely mounted arm 224 is connected by a spring 225 to the folding plate 186.

The opposed folding unit 222 carrying the folding plate 188 is similar in construction to the above-described folding unit 220 and is mounted on the vertical shaft 202. However, each unit is independently cam operated to effect folding of the flaps 182, 184 in overlapping relation. As herein shown, the arm 236 of the unit 220 is provided with an extension 246 connected by a link 248 to one arm of a bell crank 250 pivotally mounted on a stud 252 carried by a bracket 254 secured to the machine frame. The second arm of the bell crank 250 is connected by a link 256 to cam operated mechanism, not shown. The corresponding arm 237 of the unit 222 is connected by a link 260 to cam operated mechanism, not shown.

In operation, when the folding units 220, 222 are rocked from their retracted position to their folding position, the front edges of the bumper plates 228, 229 first engage opposed vertical sides of the forming block adjacent the edges or corners thereof to present the bumper plates and the folding plates 186, 188 parallel to the end surface of the forming block, the latter plates continuing their movement laterally across the end of the forming block in parallel relation thereto to effect folding of the remaining opposed extended end wall portions of the tube inwardly to lay the flaps 190, 192 in overlapping relation to the first folded flaps 182, 184 and with the ends of the last folded flaps 190, 192 in overlapping relation as shown. Here also, the provision of the bumper plates and the parallel arrangement of the folding plates 186, 188 permits initial engagement of the folding plates with the flaps 190, 192 at a point adjacent the edges of the block over which the flaps are folded to provide a tight fold at such edges.

In practice the upper and lower vertically reciprocable folding plates 178, 180 operate in cooperation with the laterally movable folding plates 186, 188 so that during the initial portion of the folding operation all four folding plates engage their respective flaps, the plates being moved in a sequence such that the first folded flaps 182, 184 are held in their folded position by the folding plates 178, 180 during the initial inward movement of the folding plates 186, 188 to produce the tapering flaps 190, 192 and the connecting gusset folds 194. The vertically reciprocable plates 178, 180 are retracted as the laterally movable plates 186, 188 complete their inward movement so that the latter plates retain all four flaps in their folded condition when the plates 178, 180 are retracted. Also, the independently operated folding plates 186, 188 cooperate to fold the ends of the flaps 190, 192 in overlapping relation, the plate 188 holding the underlying flap 190 in position while the plate 186 effects folding of the flap 192 thereover as the plate 188 is retracted a short distance. The laterally movable plates 186, 188 then come to rest in spaced relation leaving the overlapping ends of the last folded flaps 190, 192 exposed and retained in their overlapped condition preparatory to and during the first heat sealing operation for the bottom closure.

As illustrated in FIG. 1, the first heat sealing operation on the bottom closure is performed at the second station of operation while the bottom closure is held in its assembled condition to provide two spaced vertical heat seal lines 264, 266 extended across the overlapped ends of the last folded flaps 190, 192 to seal the same together and to the underlying portions of the first folded flaps 182, 184 and the intervening gusset folds 194. As herein shown, this operation is performed by a heat sealing bar 270 provided with two spaced and relatively narrow heat sealing ridges 272, 274. The bar 270 is secured to a bracket 276 by bolts 278 and is provided with intervening heat resistant insulating spacers 280. The bracket 276 is carried by parallel motion linkage including an arm 282 forming a part of a two-arm lever mounted to rock on a stud 284 which is carried by a supporting bracket 286. The second arm 288 of the lever is connected by a link 290 to cam operated mechanism, not shown. A parallel link 292 is connected between an extension 294 of the bracket 286 and the sealing bar bracket 276. The sealing bar is provided with a conventional electric heating element 294, and a thermostat element 296 in the sealing bar forms part of a control circuit arranged to maintain the bar at a predetermined temperature. The outer end of the forming block 12 is also provided with a resilient rubberlike insert 298 for cooperation with the sealing bar 270, and in operation the sealing bar is rocked into sealing engagement with the overlapping portions of the bottom closure to produce the vertical double line seal as defined by the spaced and relatively narrow seal lines 264, 266 shown in FIG. 14.

It will be observed that the parallel linkage effects movement of the sealing bar in a plane parallel to the end of the forming block and is arranged to engage the end of the forming block with a relatively slight pressure to effect fusion of the material along the seal lines as described. It will also be observed that the vertical seal lines 264, 266 are coextensive with the side seam seal lines 168, 170, and in practice the sealing bar 270 extends a short distance beyond the upper surface of the forming block so that the upper ends of the vertical seal lines 264, 266 overlap the extended ends of the side seam seal lines to assure a continuous side seam seal at the adjacent edge or corner of the block.

After completing the vertical seal in the bottom closure the forming block is moved to a third station of operation wherein provision is made for completing heat sealing of the bottom closure to provide an upper transverse double line seal defined by spaced and relatively narrow seal lines 300, 302 and a lower transverse double line seal defined by spaced and relatively narrow seal lines 304, 306. The upper seal lines extend across an area intermediate the ends of the underlying flap 182, and the lower seal lines extend across an area intermediate the ends of the underlying flap 184, and each double line seal serves to fuse its respective underlying flap to the overlying flaps and the intervening gusset folds 194.

Figures 14, 15:
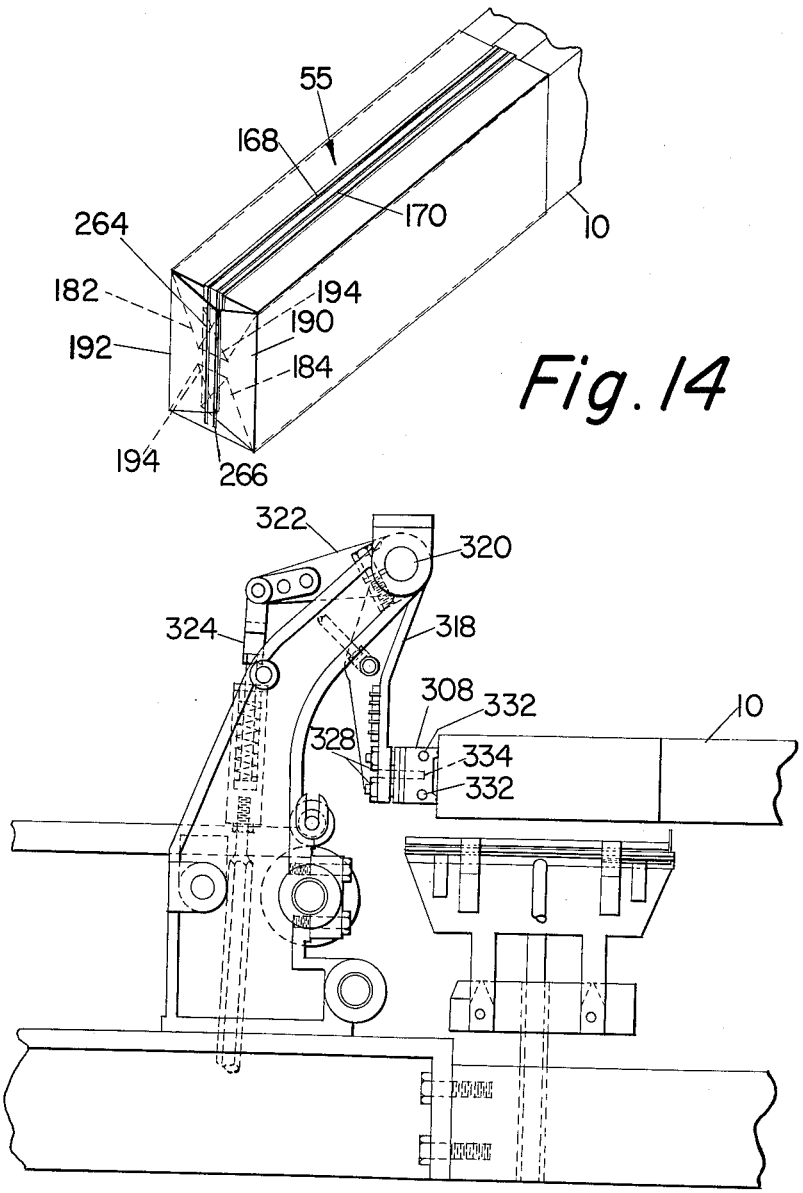
FIG. 14 is a perspective view of the forming block showing the container bottom closure provided with a heat sealed seam parallel to the vertical sides of the horizontal block.
FIG. 15 is a view in side elevation of the sealing mechanism at a third station of operation shown in FIG. 1 wherein the bottom closure is provided with transverse upper and lower heat sealed seams parallel to the upper and lower surfaces of the horizontal forming block.
Figure 16:
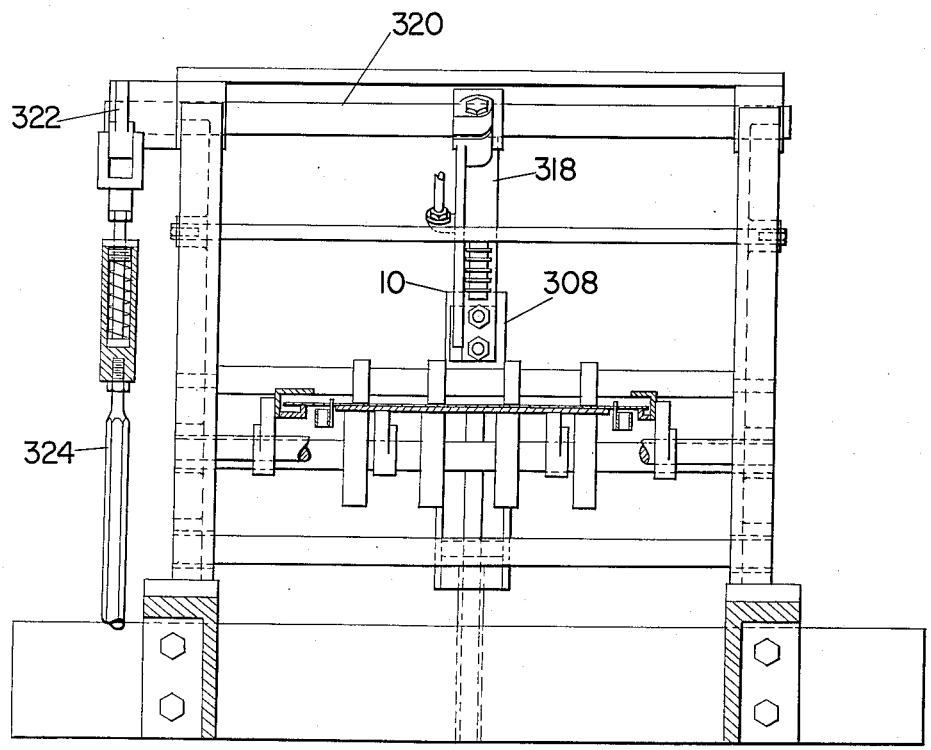
FIG. 16 is a front elevation of the same.
Figure 17:
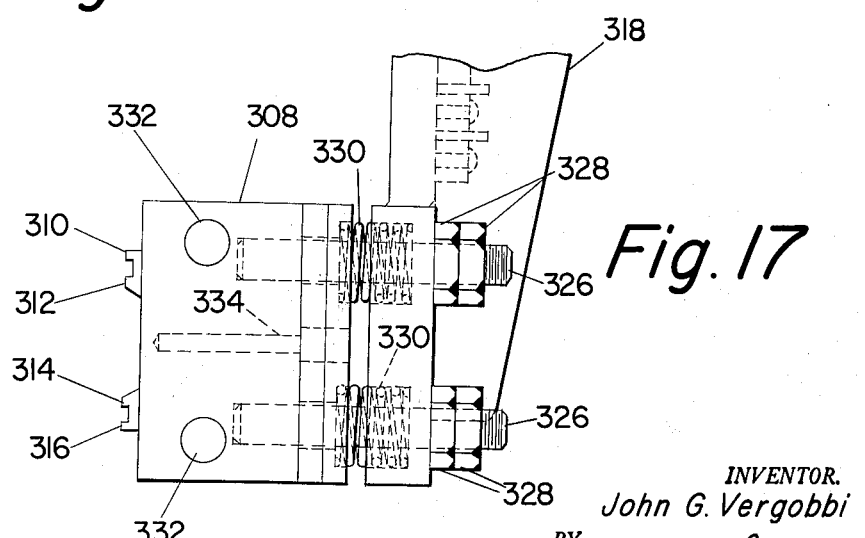
FIG. 17 is an enlarged detail view in side elevation of the heat sealing block at the third station of operation.
Figure 18:
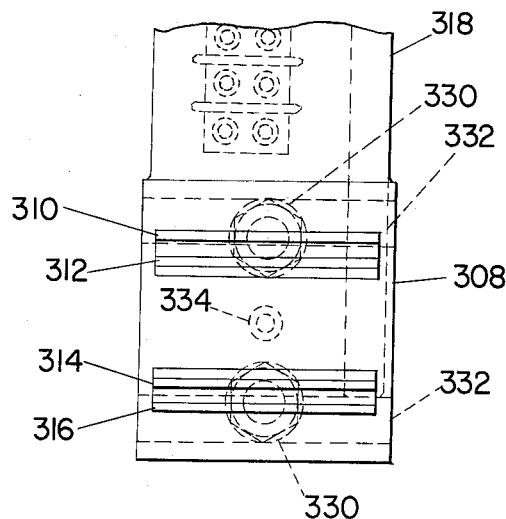
FIG. 18 is a front view of the same.
Figure 19:
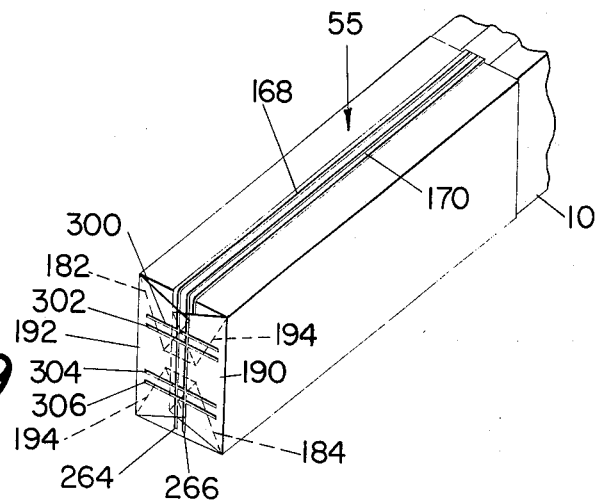
FIG. 19 is a perspective view of the completed container carried by the forming block.

As illustrated in FIG. 15, the transverse seal lines are arranged to be applied by a heat sealing block 308 provided with spaced and relatively narrow transversely extended upper sealing ridges 310, 312 and similarly extended lower sealing ridges 314, 316. The sealing block 308 is carried by a rocker arm 318 fast on a rocker shaft 320 journaled in the machine frame. The shaft 320 is also provided with an arm 322 fast thereon which is connected by a link 324 to cam operated mechanism, not shown. As herein shown, the sealing block 308 is secured to the arm 318 by bolts 326 and lock nuts 328, and in order to prevent lateral displacement of the sealing block 308 after it is engaged in parallel relation with the end of the forming block, the bolts 326 are arranged to extend through clearance openings in the arm 318. Springs 330 coiled about the bolts are interposed between the sealing block and the arm as shown. In operation when the arm 318 is rocked to present the sealing ridges in parallel relation to the end of the forming block any slight overtravel of the rocker arm 318 will be taken up by the springs 330 so as to prevent lateral displacement of the sealing block during such overtravel. It will be observed that the transverse seal lines intersect the vertical seal lines and that the transverse lines terminate short of the sides of the forming block, such lines being extended across the multiple ply portions only of the bottom closure and terminate when they reach the single ply portions thereof.

The sealing block 308 is provided with a pair of electrical heating elements as indicated at 332 and with a thermostat element 334 forming a part of control for maintaining the sealing block at a predetermined temperature, and in operation the sealing block cooperates with the resilient insert 298 in the end of the forming block with relatively slight pressure to produce the fused line seals as defined.

From the description thus far it will be seen that the folded and sealed bottom closure provides an airtight and leakproof seal, each seal comprising a double line seal bonding or welding together the multiple ply portions of the closure in an area intermediate the ends of the flaps, each flap being heat sealed and fused to adjacent underlying and overlying portions of the folded closure. While it is preferred to use double line seals, as shown, the invention also contemplates single line seals in the areas defined.

After completion of the liner bag bottom closure at the third station of operation an outer sheet or blank of bag forming material may be wrapped about the forming block and the lining bag carried thereby while disposed at said third station. The overlapping marginal portions of the outer bag preferably occur at a marginal edge of the block and are adhesively sealed together whereupon a side seam presser 336 is arranged to engage the adhesively secured side seam to set the seal. The extended portions of the outer bag may then be folded against the end of the forming block and adhesively sealed together to provide a bottom closure for the outer bag. At succeeding stations pressure is applied to the bottom closure to set the adhesive, and thereafter the lined bag may be removed from the forming block ready to be filled and provided with a top closure.

In the illustrated embodiment of the invention an individual side seam presser 336 is provided for each forming block and is maintained in an upraised position until it arrives at the third station of operation whereupon it is lowered into pressing engagement with the side seam of the outer bag. As shown in FIG. 2, the side seam presser 336 is supported by parallel linkage indicated at 338 which is carried by and movable with the spider 12. A stationary cam 340 cooperating with a roller 342 maintains the presser in its upraised position at the lining bag forming stations, as shown in FIG. 2, and the presser is rocked into engagement with the overlapping side seam of the outer bag at the third station of operation by a spring 344. Substantial pressure may be applied by a second stationary cam, not shown, arranged to cooperate with a roller 346 carried by an arm 348 forming a part of the seam presser linkage.

The upraised position of the side seam presser 336 is limited, as shown in FIG. 2, because of space limitations, and one problem encountered in the construction of the present side seam folding and sealing mechanism for the liner bag at the first station of operation was to confine the folding mechanism in the available space between the upraised presser 336 and the upper surface of the forming block 10. This was solved by providing relatively short folding arms 82, 84 and 86, 88 carried by the rocker shafts 78, 80 as described. Since such relatively short arms are limited in the extent of their effective arcuate movement to perform the side seam folding operation for the liner bag the folding plates 70, 72 carried by the relatively short arms were mounted for movement parallel to the upper surface of the forming block, as described, to increase the effective folding movement. Thus, the advantage of the present parallel mounting for the folding plates 70, 72 is twofold in that, first, it permits engagement of the extended portions 48, 51 of the bag material to be initially engaged at points adjacent the longitudinal marginal edge of the forming block to provide sharp edges or corner folds free from distortion and, second, it permits arrangement of the folding mechanism in the limited space available.

As previously described, in producing the side seam seal and the bottom closure seals for the liner bag in the present machine the sealing elements cooperate with resilient rubberlike inserts, such as "neoprene" or silicone rubber. While such materials have heat resistant properties successive sealing operations, if made on the same forming block, tend to heat up the inserts so that the heat retained thereby exceeds the desired temperature of the inserts for the sealing operation. However, in the present machine, wherein a plurality of forming blocks are intermittently operated through a plurality of stations, the present machine, having eight stations, and wherein the sealing operations are preformed at individual stations, the cooperating resilient inserts are permitted to cool sufficiently at the non-sealing stations so that the desired sealing temperature may be maintained.

Another feature of the present invention comprises the provision of control means to prevent the machine from coming to rest with the heated sealing elements in engagement with the material on the forming block so as to prevent overheating of the same and excessive melting of the material. As illustrated in FIG. 20, the control circuit is associated with a 440 v. motor starter circuit indicated generally at 352. The control circuit includes a 110 v. line indicated generally at 351 and which is provided with a switch 350 operated by a cam 354 mounted on a cam shaft 356 forming a part of the container forming machine. The switch 350, in one position of operation, is arranged to close the circuit to a relay coil 358 at a time in the cycle when the side seam sealing bar 136 is in its upraised position out of sealing engagement with the forming block. The relay coil 358 when energized is arranged to close contacts 360 of a clutch solenoid 364 included in a 20 v. safety circuit indicated generally at 362, the latter circuit being connected to the 110 v. line through a transformer 380 as shown. The clutch solenoid 364 is operatively connected to open a switch 366 in the motor starter circuit 352.

The control circuit is arranged to cooperate with known safety devices arranged to automatically open the motor starter circuit to discontinue operation of the machine when some malfunction occurs, such known safety devices being indicated diagrammatically by the normally open switch 368 forming a part of the safety circuit 362.

As herein shown, the motor starter circuit 352 also includes a stop button switch 370, a start button switch 372 and a motor starter relay 374 arranged to close the normally open holding contacts 376 in the starter circuit 352 and to open normally closed contacts 377 in the 110 v. circuit when the start button 372 is pressed. The 110 v. circuit also includes a signal lamp 378. The 20 v. safety circuit includes a relay 382 arranged to be energized when the safety switch 368 is closed. The relay 382 is arranged to close the circuit at contacts 384, 386. The safety circuit also includes a signal lamp 388 and reset switches 390, 392.

In operation if a malfunction of the machine occurs such as to effect closing of the safety switch 368, the signal lamp 388 will be lit, and the relay 382 will be energized to close holding contacts 384, 386. Lighting of the signal lamp will apprise the operator of abnormal functioning of the machine. If such indication of malfunction occurs at a time in the cycle when the side seam sealing bar 136 is in its sealing position the clutch solenoid 364 will not be actuated because the circuit to the relay 358 is open at this time. Subsequently, when the cam 354 effects closing of the circuit to the relay 358, indicating that the sealing bar 136 is in its retracted position, the relay 358 is actuated to close the clutch solenoid circuit at contacts 360, thus energizing the clutch solenoid 364 and effecting opening of the motor starter circuit at switch 366 to stop the machine. Thereafter, when the malfunction which caused closing of the safety switch 368 is corrected and the switch 368 is again returned to its normally open position, the relay 382 may be reset by pressing the button 390 or opening the switch 392 to extinguish the signal lamp 388 and to deenergize the relay 382 and open the circuit at contacts 384, 386. It will thus be seen that the machine will not be stopped by closing of the safety switch 368 until the sealing bar is in its upraised or non-sealing position to thereby prevent damage to the seal and the forming block. In practice the bottom closure sealing elements 270, 308 operate at substantially the same time in the cycle as the side seam sealing element 136 so that in operation the bottom sealing elements are also in their non-sealing position when the cam operated switch 350 is operated to close the circuit to the relay 358.

Provision is also made in the illustrated circuit for stopping the machine by pressing the stop button switch 370 and for indicating to the operator the position of the heat sealing bar 136 when the machine is thus stopped. Thus, if the stop button 370 is pressed and the machine comes to rest with the switch 350 in its dotted line position, indicating that the sealing bar is in its sealing position, the holding contacts 376, which are closed when the motor is running, will return to their normally open position, and the contacts 377 in the 110 v. circuit, which are open when the motor is running, will be closed to complete the circuit to the signal lamp 378 and apprise the operator that the sealing bar is in its sealing position at this time in the cycle. The operator must then press the start button 372 to advance the machine to that portion of the cycle where the sealing bar is in its non-sealing position, at which time the switch 350 will be moved from the dotted line position to open the circuit to the lamp 378, and again press the stop button 370. Thus, the signal lamp 378 is extinguished when the machine is stopped at that portion of the cycle when the sealing bar 136 is in its upraised or non-sealing position.

While the preferred embodiment of the invention has been herein illustrated and described, it will be understood that the invention may be embodied in other forms within the scope of the following claims.

Having thus described the invention, what is claimed is:

1. In a container forming machine of the character described, in combination, an intermittently operated forming block movable to different stations of operation, means at one station of operation for folding a blank of thermoplastic bag forming material about the block to present the longitudinal marginal edges thereof in overlapping relation, the folding means at said one station of operation including opposed folding plates mounted to be rocked into a position in parallel alignment with the surface of the block over which said marginal edges are folded and to continue their folding movement while maintained in said parallel position, means for heat sealing the overlapping edges along spaced relatively narrow lines to fuse the same in airtight relation providing a side seam disposed about medially of the width of the forming block and forming a tube having a portion projecting beyond the end of the forming block, means disposed at a second station of operation for folding opposed end walls of the projecting portions inwardly in overlapping relation against the end of the block to provide a bottom closure having opposed tapering flaps connected by intervening gusset folds, one of the first folded flaps of the bottom closure having an unsealed portion of said side seam and the ends of the last folded flaps being arranged in overlapping relation in alignment with said unsealed seam portion, means for heat sealing the bottom closure along spaced relatively narrow lines coextensive with said side seam lines to fuse said overlapping ends and said unsealed portion in airtight relation, and heat sealing means at a third station of operation providing spaced and relatively narrow line seals at right angles to and intersecting said coextensive seal lines in areas to fuse the underlying first folded flaps in airtight relation to said last folded flaps.

2. A container forming machine as defined in claim 1 wherein the side seam sealing means includes an elongated bar having spaced and relatively narrow sealing ridges, and means including a parallel motion linkage for moving the bar into and out of sealing engagement.

3. A container forming machine as defined in claim 2 wherein the bottom closure sealing means includes a sealing pad having spaced and relatively narrow sealing ridges aligned with said side seam sealing ridges and mounted for parallel movement into and out of sealing engagement with the end of the forming block, said sealing bar and said sealing pad each extending beyond the adjacent edge of the forming block whereby to assure a continuous seal in the bag at said edge.

4. A container forming machine as defined in claim 3 wherein the sealing means at the third station of operation includes a sealing pad having two pairs of spaced and relatively narrow sealing ridges and mounted to rock into parallel engagement with the end of the forming block, said third station sealing pad being mounted to maintain its parallel relation with the block during the sealing operation.

5. In a container forming machine of the character described, in combination, a forming block, means for folding a blank of thermoplastic bag forming material about three sides of the block leaving extended marginal portions, and means for folding the extended marginal portions into engagement with the remaining side of the block to present the marginal edges thereof in overlapping relation, said folding means comprising opposed independently operated folding plates mounted to be rocked into a position parallel to the surface of the block over which the extended marginal portions are folded and to continue their folding movement while maintained in said parallel position.

6. A container forming machine as defined in claim 5 wherein each folding plate mounting includes a pair of spaced rocker arms, a retaining plate carried by said arms for engagement with the edge of the block to retain its extended marginal portion against said edge, said spaced arms having grooves therein in which the folding plate is slidingly received, said arms being arranged to present the folding plate in a position parallel to the upper surface of the forming block when the leading edge of the retaining plate engages the side of the block, and means operatively connected to the folding plate for moving the same relative to the retaining plate to continue its folding movement in said parallel position.

7. A container forming machine as defined in claim 6 wherein the means for moving the folding plate includes a second pair of spaced arms arranged to be positively rocked and connected by springs to said first pair of arms to permit the retaining plate to come to rest when it engages the edge of the block while the folding plate continues its movement.

8. In a container forming machine of the character described, in combination, a forming block, means for folding a blank of thermoplastic bag forming material about the block to present the longitudinal marginal edges in overlapping relation, means for heat sealing said overlapping edges to form a side seam including an elongated bar having spaced and relatively narrow ridges, said forming block having a heat-resistant rubberlike insert for cooperation with said ridges to perform the sealing operation, means for cyclically moving the sealing bar into and out of sealing engagement with the forming block, and control means including a cam operated switch arranged to prevent stopping of the machine in that portion of a cycle when the sealing bar is in engagement with the forming block.

9. In a container forming machine of the character described, in combination, a forming block, means for folding a blank of thermoplastic material about the forming block to present the longitudinal marginal edges of the blank in overlapping relation, a heat-sealing bar cyclically movable into and out of sealing engagement with said overlapping portions, means for driving the machine including a starter circuit, a safety circuit associated with said starter circuit and having a safety switch adapted to be closed upon malfunction of the machine, a solenoid operated clutch coil in said safety circuit, a relay in said motor starter circuit adapted to actuate said clutch coil, and a cam operated switch arranged to close the circuit to said relay to energize the clutch coil and stop the machine only when the heat-sealing bar is in its non-sealing position when a malfunction occurs to close said safety switch.

10. A container forming machine as defined in claim 9 wherein the safety circuit includes a signal lamp which is lit when the safety switch is closed to apprise the operator of a malfunction, said lamp being extinguished when the malfunction is corrected and the safety switch is opened.

11. A container forming machine as defined in claim 9 wherein the motor starter circuit includes a manually operated stop switch and a signal lamp, the circuit to said lamp being closed through said cam operated switch to light the lamp when the machine is stopped with the sealing bar in its sealing position, said circuit being opened to extinguish the lamp when the machine is stopped with the sealing bar in its non-sealing position.

12. In a container forming machine of the character described, in combination, a forming block, means for folding a blank of thermoplastic bag forming material about three sides of the block leaving extended marginal portions, means for folding the extended marginal portions into engagement with the remaining side of the forming block to present the marginal edges thereof in overlapping relation, means for heat sealing the overlapping edges to fuse the same in airtight relation providing a longitudinal side seam disposed medially of the forming block and forming a tube having a portion projecting beyond the end of the forming block, means for thereafter folding opposed end walls of the projecting portion inwardly in overlapping relation against the end of the block to provide a bottom closure having opposed tapering flaps connected by intervening gusset folds, and means for heat sealing the bottom closure along predetermined areas at right angles to and intermediate the ends of each flap to fuse the overlapping portions of the flaps and the gusset folds in airtight relation, said side seam folding means comprising opposed folding plates mounted to be rocked into a position in parallel alignment with the surface of the block over which the extended marginal portions are folded and to continue their folding movement while maintained in said parallel position.

13. In a container forming machine of the character described, in combination, a forming block, means for folding a blank of thermoplastic bag forming material about three sides of the block leaving extended marginal portions, means for folding the extended marginal portions into engagement with the remaining side of the forming block to present the marginal edges thereof in overlapping relation, means for heat sealing the overlapping edges to fuse the same in airtight relation providing a longitudinal side seam disposed medially of the forming block and forming a tube having a portion projecting beyond the end of the forming block, means for thereafter folding opposed end walls of the projecting portion inwardly in overlapping relation against the end of the block to provide a bottom closure having opposed tapering flaps connected by intervening gusset folds, and means for heat sealing the bottom closure along predetermined areas at right angles to and intermediate the ends of each flap to fuse the overlapping portions of the flaps and the gusset folds in airtight relation, said side seam folding means comprising opposed folding plates mounted to be rocked into a position in parallel alignment with the surface of the block over which the extended marginal portions are folded and to continue their folding movement while maintained in said parallel position, said folding plates being independently operated to present the extended marginal portions in overlapping relation, said plates coming to rest in spaced relation to expose the overlapping portions and to hold the same in their overlapped condition during the sealing operation.

14. In a container forming machine of the character described, in combination, a forming block, means for folding a blank of thermoplastic bag forming material about three sides of the block leaving extended marginal portions, means for folding the extended marginal portions into engagement with the remaining side of the forming block to present the marginal edges thereof in overlapping relation, means for heat sealing the overlapping edges to fuse the same in airtight relation providing a longitudinal side seam disposed medially of the forming block and forming a tube having a portion projecting beyond the end of the forming block, means for thereafter folding opposed end walls of the projecting portion inwardly in overlapping relation against the end of the block to provide a bottom closure having opposed tapering flaps connected by intervening gusset folds, and means for heat sealing the bottom closure along predetermined areas at right angles to and intermediate the ends of each flap to fuse the overlapping portions of the flaps and the gusset folds in airtight relation, said side seam folding means comprising opposed folding plates mounted to be rocked into a position in parallel alignment with the surface of the block over which the extended marginal portions are folded and to continue their folding movement while maintained in said parallel position, and retaining plates associated with said folding plates for engaging the sides of the block adjacent the longitudinal edges thereof to hold the extended marginal portions in tight engagement with the edges of the block during the folding operation.

15. In a container forming machine of the character described, in combination, a forming block, means for folding a blank of thermoplastic bag forming material about three sides of the block leaving extended marginal portions, means for folding the extended marginal portions into engagement with the remaining side of the forming block to present the marginal edges thereof in overlapping relation, means for heat sealing the overlapping edges to fuse the same in airtight relation providing a longitudinal side seam disposed medially of the forming block and forming a tube having a portion projecting beyond the end of the forming block, means for thereafter folding opposed end walls of the projecting portion inwardly in overlapping relation against the end of the block to provide a bottom closure having opposed tapering flaps connected by intervening gusset folds, and means for heat sealing the bottom closure along predetermined areas at right angles to and intermediate the ends of each flap to fuse the overlapping portions of the flaps and the gusset folds in airtight relation, said side seam folding means comprising opposed folding plates mounted to be rocked into a position in parallel alignment with the surface of the block over which the extended marginal portions are folded and to continue their folding movement while maintained in said parallel position, and retaining plates associated with said folding plates for engaging the sides of the block adjacent the longitudinal edges thereof to hold the extended marginal portions in tight engagement with the edges of the block during the folding operation, the leading edges of the parallel aligned folding plates being arranged to initially engage the extended portions of the blank adjacent the edges of the forming block to provide sharp folded edges.

16. In a container forming machine of the character described, in combination, an intermittently operated forming block movable to different stations of operation, means at one station of operation for folding a blank of thermoplastic bag forming material about the block to present the longitudinal marginal edges thereof in overlapping relation, means for heat sealing the overlapping edges along spaced relatively narrow lines to fuse the same in airtight relation providing a side seam disposed about medially of the width of the forming block and forming a tube having a portion projecting beyond the end of the forming block, means disposed at a second station of operation for folding opposed end walls of the projecting portions inwardly in overlapping relation against the end of the block to provide a bottom closure having opposed tapering flaps connected by intervening gusset folds, one of the first folded flaps of the bottom closure having an unsealed portion of said side seam and the ends of the last folded flaps being arranged in overlapping relation in alignment with said unsealed seam portion, means for heat sealing the bottom closure along spaced relatively narrow lines coextensive with said side seam lines to fuse said overlapping ends and said unsealed portion in airtight relation, and heat sealing means at a third station of operation providing spaced and relatively narrow line seals at right angles to and intersecting said coextensive seal lines in areas to fuse the underlying first folded flaps in airtight relation to said last folded flaps, the bottom closure folding means at said second station of operation including opposed folding plates for folding the first folded flaps, and opposed cooperating folding plates for folding the last folded flaps, said cooperating folding plates being independently operated and mounted to be rocked into parallel alignment with the end of the forming block and to continue their folding movement while maintained in said parallel alignment, said cooperating plates being arranged to hold the flaps in their folded relation during the sealing operation.

17. In a container forming machine of the character described, in combination, a forming block, means for folding a blank of thermoplastic bag forming material about three sides of the block leaving extended marginal portions, and means for folding the extended marginal portions into engagement with the remaining side of the block to present the marginal edges thereof in overlapping relation, said folding means comprising opposed independently operated folding plates mounted to be rocked into a position parallel to the surface of the block over which the extended marginal portions are folded and to continue their folding movement while maintained in said parallel position, and means for heat sealing said overlapping edges to form a side seam including an elongated bar having spaced and relatively narrow ridges, said forming block having a heat-resistant rubberlike insert for cooperation with said ridges to perform the sealing operation.

18. A container forming machine as defined in claim 17 wherein the engaging surfaces of said ridges and said insert are coated with an antistick to prevent adherence of the heat-softened bag material to the same.

19. A container forming machine as defined in claim 17 wherein the forming block is intermittently moved to successive operating stations whereby the heat transmitted to the rubber insert at the heat-sealing station is dissipated during travel of the block through non-sealing stations in readiness for a subsequent heat-sealing operation when it is returned to said heat-sealing station.

20. In a container forming machine of the character described, in combination, a forming block, means for folding a blank of bag forming material about the block to present the longitudinal marginal edges in overlapping relation, means for heat sealing the overlapping edges to provide a longitudinal side seam seal extending slightly beyond an end of the forming block and forming a tube having a portion extending beyond the end of the block, means for folding the opposed end walls of the projecting portion of the tube in overlapping relation to provide a bottom closure, and means for heat sealing the bottom closure along lines at right angles to the folded end walls and coextensive with the side seam seal, said bottom closure sealing means extending slightly beyond the upper surface of the block to provide a seal which overlaps the side seam seal whereby to form an airtight bottom closure.

References Cited in the file of this patent
UNITED STATES PATENTS

| | | |
|---|---|---|
| 1,882,049 | Wellman | Oct. 11, 1932 |
| 2,168,543 | Vergobbi | Aug. 8, 1939 |
| 2,190,479 | Moore | Feb. 13, 1940 |
| 2,533,642 | Vergobbi | Dec. 12, 1950 |
| 2,638,724 | Harvey | May 19, 1953 |